Dec. 31, 1929.　　　O. J. NITARDY　　　1,741,247
WIND MOTOR
Filed March 5, 1928　　2 Sheets-Sheet 1

Inventor
Otto J. Nitardy
By his Attorneys
Williamson Reig & Williamson

Dec. 31, 1929.   O. J. NITARDY   1,741,247
WIND MOTOR
Filed March 5, 1928   2 Sheets-Sheet 2
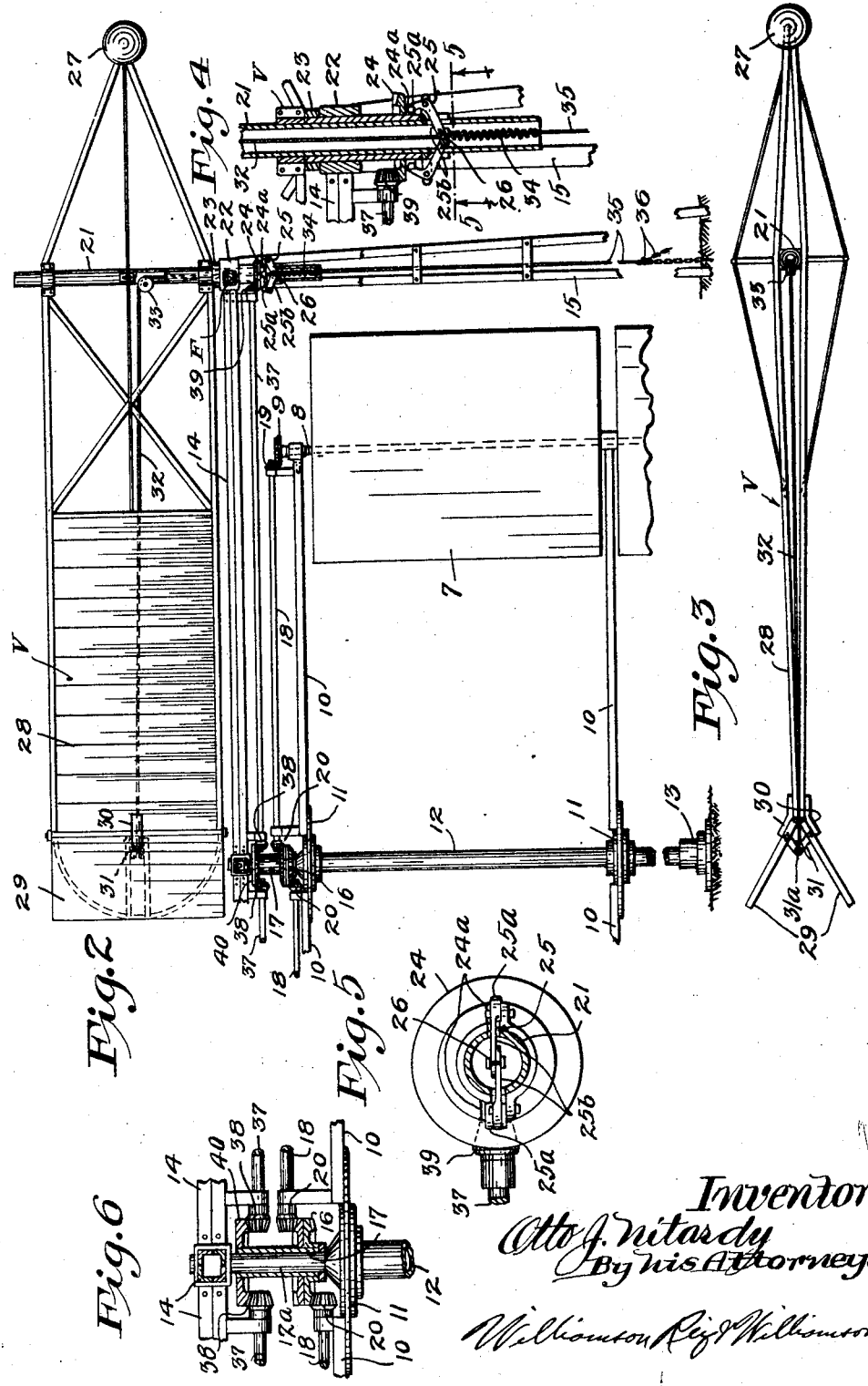
Inventor
Otto J. Nitardy
By his Attorneys
Williamson Reif & Williamson Patented Dec. 31, 1929

1,741,247

UNITED STATES PATENT OFFICE

OTTO J. NITARDY, OF MINNEAPOLIS, MINNESOTA

WIND MOTOR

Application filed March 5, 1928. Serial No. 259,247.

This invention relates to wind motors and more particularly to wind motors of the type described in my Patent No. 1,651,067, issued March 29th, 1927.

It is an object of my present invention to provide a wind motor including a rotor carrying a plurality of wings with means for rotating or feathering the wings on their respective axes in such a manner as to expose them to the wind at the angle of greatest efficiency throughout their respective orbits and to provide such a device with improved means for automatically controlling the wings to hold the rotor against the wind until the wind becomes excessive, and to then temporarily permit the rotor to swing away from the wind, thus governing the speed of the motor.

A further object is to provide in a wind motor of the class described in my said prior patent, mechanism controlled by the direction of the wind for normally causing the several wings to be held for proper action by the wind, said mechanism including a throw out device in connection with a vane for causing the vane to be disengaged with the means for controlling the position of the several wings when the wind exceeds a predetermined velocity.

A still further object of this invention is to provide in a wind motor of the type above described, a plurality of co-operating governing vanes spaced a considerable distance apart and adapted in co-operation to normally hold the several wings disposed in most efficient position for action by the wind and adapted when all are acted upon by excessive wind pressure to release the several wings, causing the latter to be so disposed that the wind will not act upon the rotor.

These and other objects and advantages of the invention will be apparent from the following description made in connection with the accompanying drawings wherein like reference characters refer to similar parts throughout the several views, and in which:

Fig. 2 is a vertical section through the upper portion of the device illustrated in Fig. 1, showing the structure of one of the governing vanes and its relation with the rotor and wings thereof;

Fig. 3 is a plan view of one of the governing vanes;

Fig. 4 is a vertical section on a larger scale taken through the vertical pivot member or post for one of the governing vanes;

Fig. 5 is a cross section taken on the line 5—5 of Fig. 4; and

Fig. 6 is a vertical section through the upper portion of the rotor shaft and the master gear for controlling the position of the wings.

Figure 1:
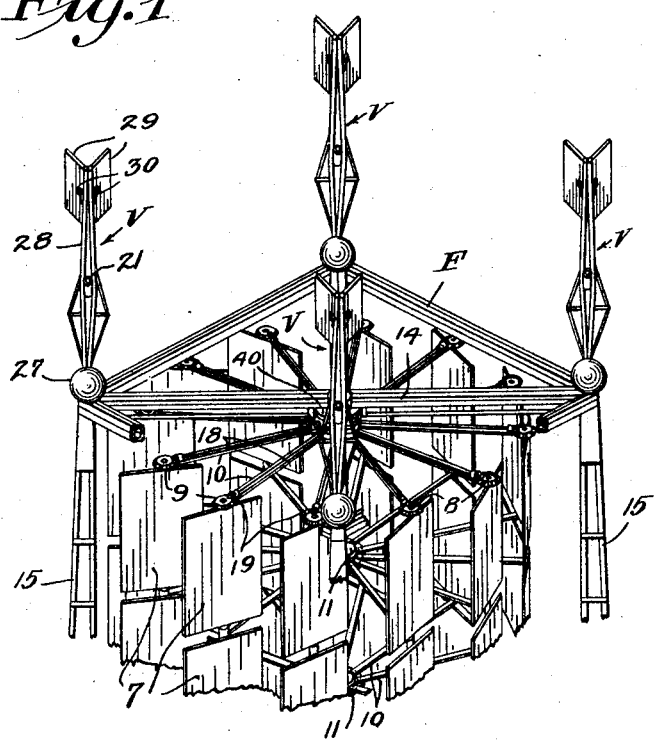
Fig. 1 is a perspective view of the upper portion of an embodiment of my invention including the upper series of circumferentially spaced wings in the rotor and co-operating governing vanes.

As illustrated in the drawings, my wind motor includes a relatively large rotor having mounted thereon one or more series of circumferentially arranged vertical wings 7, said wings being mounted for rotation on vertical axes and as shown being fixed to the vertical shafts 8, the upper ends of which have rigidly secured thereto beveled gears 9. As shown, the rotor frame comprises two or more series of radially disposed horizontal arms 10, each series being fixed at their inner ends to a hub 11, and hubs 11 being fixed to a vertical shaft 12, the lower end of which may be suitably journaled in a thrust bearing 13. The upper end of said vertical shaft, as shown, is diminished at 12$^a$ and journaled in a suitable bearing supported concentrically of an outer frame F of rectangular shape having the diagonal cross members 14, said cross members at their intersection supporting said bearing and at their outer ends being supported by a plurality of upright standards or legs 15.

A double faced master beveled gear or driving element 16 fixed to the end of a sleeve 17 is loosely mounted upon the diminished upper end of shaft 12 and a plurality of radially disposed horizontal shafts 18 connect master gear 16 with the several shafts 8 of the wings. Shafts 18 carry beveled gears 19 at their outer extremities meshing with beveled gears 9 of the wings. The inner ends of radial shafts 18 carry small beveled gears 20 meshing with the master gear 16. In order that ample space may be supplied for the intermeshing of the beveled gears 20 with master gear 16 alternate shafts journaled on the top of the rotor are disposed above and below the beveled gear, as shown in Figs. 2 and 6. The several beveled gears are so related that the wings 7 will be turned through one-half a rotation for every revolution of the rotor, thus maintaining the wings at all times in the most advantageous position with respect to the winds.

Master gear 16 is maintained at the proper position to control the rotation of wings 7 with respect to the wind by means of a plurality of spaced vanes V. As illustrated, four of said vanes are provided mounted for oscillation on vertical axes and one mounted at each corner of the outer frame F above one of the legs 15. As shown, each of said vanes V is fixed to an upright tubular member 21, said tubular member being journaled in a bearing 22 provided in a corner of frame F and also carrying a fixed collar 23, which bears against the upper end of bearing 22. Tubes 21 extend below frame F and each has loosely mounted thereon a beveled gear 24, said beveled gear at its lower side carrying a notched portion or clutch element 24$^a$. Below said clutch element a pair of dogs 25 are pivotally mounted in tubular member 21, said dogs having teeth 25$^a$ disposed externally of said tube and adapted to normally engage the clutch element 24$^a$ to fix beveled gear 24 to the vane tube 21. Dogs 25 have inwardly extending arms 25$^b$, the extremities of which are slotted longitudinally and connected together by means of a pin 26.

Vane V as shown is provided with a ball 27 at its forward portion and a relatively large wind area 28 at its rear portion. A pair of diverging blades 29 are pivotally secured to the rear extremity of vane V mounted for oscillation on vertical axes and limited in outward swinging movement by suitable stop plates 30. A toggle arm 31 connects the two blades 29 on each vane and its intermediate pivot 31$^a$ is connected with a cable or flexible member 32 extending horizontally to the vane tube 21 and passing over a sheave 33 and downwardly through the tube 21 and connected at its lower end to the pin 26 connecting the inner ends of dogs 25. Each of the pins 26 may carry a depending elastic member, such as a spring 34, to the lower end of which is secured a flexible member 35 for normally holding dogs 25 in engagement with the clutch element 24$^a$. The lower end of flexible member 35 may be adjustably anchored to the base of legs 15 by any suitable means, such as the chain and anchoring device 36.

Master gear 16 is connected for oscillation with the several vanes V by means of a plurality of horizontal shafts 37 extending radially of frame F and journaled in suitable depending bearings carried by said frame, said shafts having beveled gears 38 and 39 respectively at their inner and outer ends, said beveled gears 39 engaging beveled gears 24 and said beveled gears 38 engaging a beveled gear 40 fixed to the upper end of sleeve 17 which carries master gear 16.

*Operation*

The operation of my improved wind motor may be briefly described as follows:—

Assuming the vanes V to be maintained in a predetermined position by a steady wind of normal velocity, master gear 16 is held in a predetermined position by means of the driving connections between shafts 37 and the upright tubes 21 of the several vanes. Since I provide a plurality of vanes at the several corners of the frame F and since these vanes are spaced a considerable distance apart, slight fluctuations of wind currents will not cause master gear 16 to oscillate. The rotor will be turned by the action of the wind against the wings 7 and said wings as the rotor revolves are rotated by means of the engagement between master gear 16 and the wing shafts 8. As described in my earlier Patent No. 1,651,067, issued March 29th, 1927, the wings 7 are rotated through one-half of a revolution for every revolution of the rotor.

The wings in each series are successively set at the proper angle to most advantageously receive the wind when master gear 16 is properly maintained.

The large wind areas 28 of the vanes will, of course, cause said vanes to be substantially alined with the direction of the wind and the wind will, of course, strike the diverging blades 29 tending to swing said blades inwardly when the wind exceeds a predetermined velocity. The two blades 29 of each vane will be moved together through a sufficient distance to cause a pull on cable 32, thereby raising the pin 26 which connects the arms of dogs 25 and disengaging said dogs from the clutch elements 24$^a$ of the beveled gears 24. Beveled gears 24 at this time will be loose upon tubes 21 and assuming the wind is strong enough to release all four of said beveled gears 24, master gear 16 will be free to oscillate and the wings 7 will no longer be held into the wind. Oscillation of master gear 16 is, however, retarded due to its connections with the several radial shafts 18 and beveled gears 9 of the wing shafts.

It will be seen that before master gear 16 can be released all of the beveled gears 24 must be released from engagement with their respective dogs 25 and that consequently an air current of high velocity reacting against one or two of the wings will not be sufficient to stop or retard the revolution of the rotor. The tension on the several springs 34 may be varied as desired by adjusting the connection between the cables 35 and their anchoring means. Thus, the device may be adjusted to throw out at a predetermined velocity of wind.

In my prior patent heretofore identified the position of the master gear for feathering the wings was controlled by a single vane provided with a governing mechanism. This was not entirely satisfactory since the continual oscillation of the master gear caused a loss of efficiency in the rotor. With a plurality of my improved vanes spaced a wide distance apart excellent results can be obtained and the device may be set to throw out, as has been stated, at a predetermined velocity of wind.

It will, of course, be understood that various changes may be made in the form, details, arrangement and proportions of the parts without departing from the scope of the invention.

What is claimed is:

1. In a wind motor, a rotor, a plurality of circumferentially disposed wings mounted for independent rotation on said rotor with their axes substantially parallel with the axis of said rotor, means for feathering all said wings during the movement of said rotor, including a master driving element co-axial with said rotor, a plurality of widely spaced vanes connected with said master driving element for conjointly maintaining the position of the master driving element.

2. In a wind motor, a rotor, a plurality of circumferentially disposed wings mounted for independent rotation on said rotor with their axes substantially parallel with the axis of said rotor, means for feathering all said wings during the movement of said rotor, including a master driving element co-axial with said rotor, a plurality of widely spaced vanes mounted on vertical axes, each of said vanes carrying a co-axial driving member, and driving connections between said respective driving members and said master driving element to conjointly maintain the position of said master driving element.

3. In a wind motor, a rotor, a plurality of circumferentially disposed wings mounted for independent rotation on said rotor with their axes substantially parallel with the axis of said rotor, means for feathering said wings during the movement of said rotor including a master gear co-axial with said rotor, a plurality of widely spaced vanes each normally connected with said master gear for conjointly maintaining the position of the same, means carried by each vane for disconnecting the same from engagement with said master gear when an air current striking a vane exceeds a predetermined velocity, whereby when said means on all said vanes are actuated, said master gear will be loosely mounted.

4. In a wind motor, a rotor, a plurality of circumferentially disposed wings mounted for independent rotation on said rotor with their axes substantially parallel with the axis of said rotor, means for feathering said wings, including a master gear co-axial with said rotor, a vane having clutch engagement with said master gear and a blade carried by said vane adapted to normally extend in wind obstructing position, and means connected with said blade for releasing said clutch engagement when said blade is swung due to a wind of excessive velocity.

5. In a wind motor, a rotor, a plurality of circumferentially disposed wings mounted for independent rotation on said rotor, with their axes substantially parallel with the axis of said rotor, means for feathering said wings during the movement of said rotor including a master gear co-axial with said rotor, a vane adapted for oscillation on a vertical axis and a co-axial driving member carried by said vane and having clutch engagement with said vane, a connection between said driving member and said master gear, a pair of blades hinged to the tail portion of said vane on vertical axes, said blades normally extending in wind obstructing position and means interposed between said blades for controlling said clutch engagement whereby said vane will be disconnected from said master gear when the wind exceeds a predetermined velocity.

6. In a wind motor, a rotor, a plurality of circumferentially disposed wings mounted for independent rotation on said rotor with their axes substantially parallel with the axis of said rotor, means for conjointly feathering all of said wings during the movement of said rotor, said means comprising a master driving member co-axial with said rotor and driving connections between said master element and said several wings, a plurality of widely spaced vanes mounted on vertical axes, each of said vanes carrying a driving element, driving connections between the several driving elements of said vanes and said master element to conjointly maintain the position of said master element, swingable blades carried by said vanes and yieldingly extended in wind obstructing position, and connections between said blades and said driving connections for disconnecting said driving connections from said master element when the wind exceeds a predetermined velocity.

In testimony whereof I affix my signature.

OTTO J. NITARDY.